United States Patent
Kneifel, II et al.

(10) Patent No.: US 6,807,461 B2
(45) Date of Patent: Oct. 19, 2004

(54) COORDINATED ROBOT CONTROL FROM MULTIPLE REMOTE INSTRUCTION SOURCES

(75) Inventors: R. William Kneifel, II, Rochester Hills, MI (US); Kenneth A. Stoddard, Rochester, MI (US)

(73) Assignee: Kuka Roboter GmbH, Augsburg (DE)

( * ) Notice: Subject to any disclaimer, the term of this patent is extended or adjusted under 35 U.S.C. 154(b) by 253 days.

(21) Appl. No.: 10/153,537

(22) Filed: May 22, 2002

(65) Prior Publication Data

US 2003/0220715 A1 Nov. 27, 2003

(51) Int. Cl.$^7$ ............................................. G05B 19/418
(52) U.S. Cl. ...................... 700/248; 700/174; 700/245; 700/248; 118/500; 29/464; 901/31; 901/41
(58) Field of Search ................................. 700/245, 248, 700/174; 118/500, 503, 679, 680, 681; 29/897.2, 771, 464, 559, 784, 795, 712, 281.1, 281.5, 822; 901/31, 41

(56) References Cited

U.S. PATENT DOCUMENTS

| | | | | |
|---|---|---|---|---|
| 4,548,346 A | * | 10/1985 | Kraus et al. ............... 228/49.6 |
| 4,553,309 A | * | 11/1985 | Hess et al. ................... 29/450 |
| 4,708,175 A | * | 11/1987 | Janashak et al. ............. 141/1 |
| 4,738,387 A | * | 4/1988 | Jaufmann et al. ........... 228/4.1 |
| 4,744,500 A | * | 5/1988 | Hatakeyama et al. ....... 228/4.1 |
| 4,768,462 A | * | 9/1988 | Kuronaga et al. ........... 118/315 |
| 5,184,766 A | * | 2/1993 | Takahashi et al. ........... 228/4.1 |
| 5,272,805 A | * | 12/1993 | Akeel et al. ................. 29/712 |
| 6,065,200 A | * | 5/2000 | Negre ........................ 29/430 |
| 6,078,846 A | * | 6/2000 | Greer et al. ................. 700/174 |
| 6,197,115 B1 | * | 3/2001 | Barrey et al. ............... 118/681 |
| 6,378,186 B1 | * | 4/2002 | Angel ....................... 29/281.1 |
| 6,438,842 B1 | * | 8/2002 | Raami ...................... 29/897.2 |

OTHER PUBLICATIONS

Ktamura et al., Parallel algorithms/architecture synthesis, 1997, IEEE, pp. 316–323.*

Nozal et al., Hardware structures and digital signal processor for image pprocessing on real time, 1992, IEEE, pp. 1397–1402.*

* cited by examiner

Primary Examiner—Thomas G. Black
Assistant Examiner—McDieunel Marc
(74) Attorney, Agent, or Firm—McGlew and Tuttle, P.C.

(57) ABSTRACT

A robot control system is provided for facilitating coordination amongst various robotic machines. The robot control system includes a plurality of robot controllers, such that each robot controller having an associated motion system adapted to control at least one robotic machine and the associated motion system is adapted to receive motion control commands from more than one robot control program. The robot control system further includes a remote instruction source that supplies motion control commands to the robot controllers, and a mutual exclusion mechanism residing on either the remote program instruction source or one of the robot controllers, where the mutual exclusion mechanism prevents simultaneous access by more than one robot control program to a given robotic machine. In operation, motion control commands are propagated from the remote program instruction source over a computer network to a selected group of the robot controllers.

19 Claims, 4 Drawing Sheets

COORDINATED ROBOT CONTROL FROM MULTIPLE REMOTE INSTRUCTION SOURCES

BACKGROUND AND SUMMARY OF THE INVENTION

The present invention relates generally to robotic machines, and more particularly, to a robot control system for controlling multiple robotic machines where at least some of the robotic machines are controlled using a control program that resides on a controller other than the local controller of the controlled robotic machines.

When first introduced into the manufacturing environment, each automated robotic machine was dedicated to performing a specific task independent of any other robotic machine. Each robotic machine typically included a dedicated controller and an associated motion system for controlling its physical movements. The operation of the robotic machine is dictated by control program instructions which are embodied, in a control program. The control program instructions are converted by the controller into motion control commands which in turn are carried out by the motion system of the robotic machine. Thus, each robotic machine required its own control program.

As automation became more prevalent in the manufacturing environment, it was envisioned that robotic machines would cooperatively work together to complete various manufacturing tasks. For example, a first robotic machine may transfer a workpiece from a conveyor into a workstation. At the workstation, one or more additional robotic machines would perform various manufacturing operations on the workpiece. Lastly, the workpiece is transferred back to the conveyor and transported to the next workstation.

In this example, the various tasks need to be coordinated amongst the robotic machines. For instance, the first robotic machine is responsible for transferring the workpiece to and from the conveyor. Additionally, this robotic machine must know how long to wait before removing the workpiece from the workstation, thereby allowing the completion of the manufacturing operations by the other robotic machines. Since each robotic machine relies on its own control program, coordination amongst the robotic machines must be designed into the control programs residing on each robotic machine. In this way, coordinating tasks amongst robotic machines is difficult and complex.

One approach for simplifying the coordination amongst robotic machines is illustrated in FIG. 1. In this approach, a single controller 4 uses one control program 6 to provide motion control commands to a plurality of robotic machines 8. In other words, all the robotic machines physically share the same controller to perform their respective tasks. In order for each robotic machine to perform an independent task, the single controller must support the execution of multiple control programs in a multi-tasking environment, such that the coordination of tasks between the robotic machine is dispersed amongst one or more control programs. Because all of the robots are controlled from the same controller, it is relatively straightforward to coordinate the control among the tasks, because 1) multi-tasking programming constructs, such as semaphores and mutexes are provided for the programmer on such a controller, and 2) It is usually possible during simple sequences involving multiple robots for a single control program to control multiple machines.

The problem with the above solution is that the transfer of control of one robot between various control programs is limited only to that robot controller. Control of simple sequences between robots residing on different controllers remains a challenging task.

One of the objectives of the present invention is to dynamically exchange control of a given robot between various control programs running on different robot controllers. This makes it possible for robots controlled by different controllers, working more or less independently to occasionally come under the control of a single control program, so that one program can control a sequence involving more than one robot. This is important, because it is much easier for a programmer to create a reliable sequence of events in a single program thread than to try to cause two or more separate programs to perform a set of events in sequence. For instance, passing a part from one robot to another or moving more than one robot simultaneously with a single control instruction.

In order for the dynamic exchange of control to work well, a robot control system should include four key features. First, a control program must be able to issue commands to more than one robot either in sequence or simultaneously. This is how a simple sequence is achieved. For example, the control program would move a robot carrying a part to a drop position and open its gripper to drop the part. The same control program would then move a second robot to the drop position and close its gripper to pick up the part.

Second, the motion system, working on behalf of a given robot, must be able to accept commands for that robot from more than one control program. By this feature, a robot can work independently while being controlled by one control program, then work in a sequence or simultaneously with another robot by accepting commands from a different control program.

Third, a mutual exclusion mechanism should be available, so that control programs do not simultaneously issue commands to the same robot. Since one of the objectives of this invention is convenience of programming, a mutual exclusion mechanism is built into the robot control system. As further described below, the mutual exclusion method may be of several different forms.

Fourth, an instruction source must be able to issue motion commands from a control program across a communications network to a motion system residing on a robot controller different from where the instruction source resides. This is necessary, so that the locality of cooperation is unrestricted. For example, if the control program must reside on the same controller as the motion system for the robot it can control, then the exchange of control between control programs is limited to only the robots controlled by that robot controller. The locality of exchange is thus limited to those robots.

The term "multitasking" is used to describe a known feature of conventional robot controllers. This term refers to the ability of the robot controller to perform several tasks simultaneously. Several different methods may be used to perform several tasks simultaneously. These include multi-tasking interpreters that run separate program files simultaneously, multitasking operating systems that can run multiple compiled programs simultaneously, special interpreters that can run multiple co-routines simultaneously, or other methods used to run multiple threads of execution simultaneously. In this application, the meaning of "control program" is equivalent to a task, regardless of the method used to perform a task. The meaning of "instruction source" is any of the mechanisms capable of executing one or more control programs on the same robot controller. It is also possible that a multi-tasking instruction source could exist on its own computer, not part of a robot controller Some known robot controllers have multitasking capabilities, but restrict each control program so that it can control only one robot and each robot can be run only by that control program. The present invention clearly requires that no such restriction is present, because this would contradict the first two features listed above. Other known robot controllers have more general multitasking capabilities but may be missing one of the first three features listed above. However, no known robot control systems, including those with multitasking capabilities, implement all four of the above listed features.

The present invention takes a different approach to facilitate the coordination amongst numerous robotic machines. A robot control system may be comprised of a plurality of robot controllers, where each of the controllers includes an associated motion system and is adapted to control a physically attached robotic machine. However, in accordance with the present invention, a single control program may be used to take logical temporary ownership of a robot controlled by the motion system of any of the robot controllers and issue motion commands for that robot to the appropriate motion systems.

Thus, the robot control system of the present invention includes one or more remote instruction sources that supply motion control commands to a plurality of robotic machines. Each instruction source is comprised of a memory for storing at least one robot control program and a processor for converting the control program into motion control commands. The instruction source may reside within one or more of the robot controllers or within a computer external to the robot controller.

A computer network is used to communicate between the plurality of robot controllers and other instruction source computers, so that an instruction source can send motion control commands to the motion system of a selected group of robot controllers. Attach/detach commands embodied in the motion control commands are used to mediate the operating state of at least one of the robot controllers via the motion systems of such robot controllers. When in an attached state, the motion systems of the selected robots operate only upon motion control commands received from the instructions source that issued a corresponding attach command. When in a detached state, selected robots may be attached to a different instruction source and then subsequently operate upon motion control commands from that other instruction source.

For a more complete understanding of the invention, its objects and advantages refer to the following specification and to the accompanying drawings.

DETAILED DESCRIPTION OF THE PREFERRED EMBODIMENTS

Figure 1:
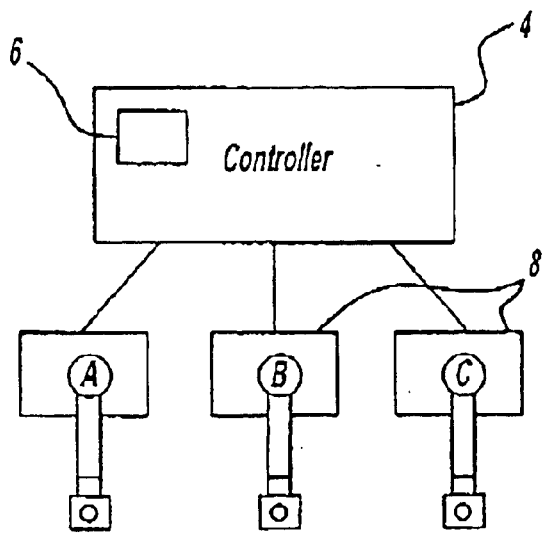
FIG. 1 is a block diagram depicting a prior art robot control system employing a single controller for controlling multiple robotic machines.
Figure 2:
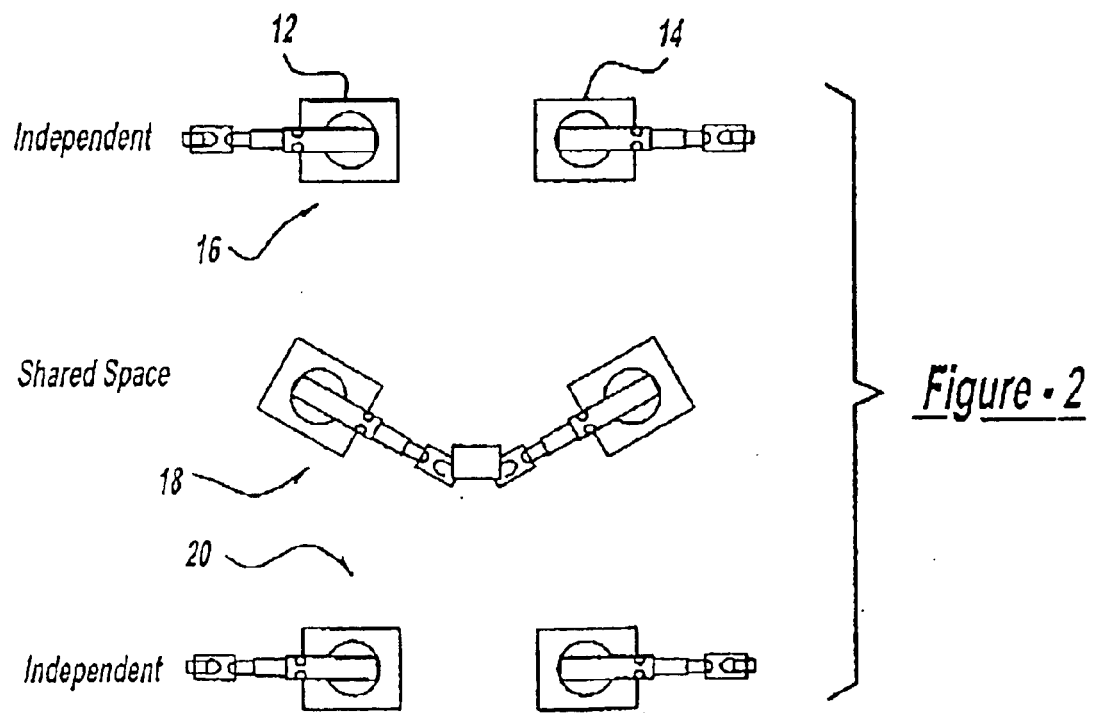
FIG. 2 is a plan view of an exemplary manufacturing workstation employing cooperating robotic machines.

An example of cooperating robotic machines in a manufacturing environment is illustrated in FIG. 2. In this example, a first robotic machine 12 and a second robotic machine 14 work together to perform various manufacturing operations. Initially, each of the robots operate independently to perform different manufacturing tasks as shown at 16. However, the robots may also perform a cooperative task as shown at 18. For example, the first robot 12 may transfer a workpiece to the second robot 14. Upon completion of this task, each of the robots continue to independently perform different manufacturing tasks as shown at 20.

Figure 3:
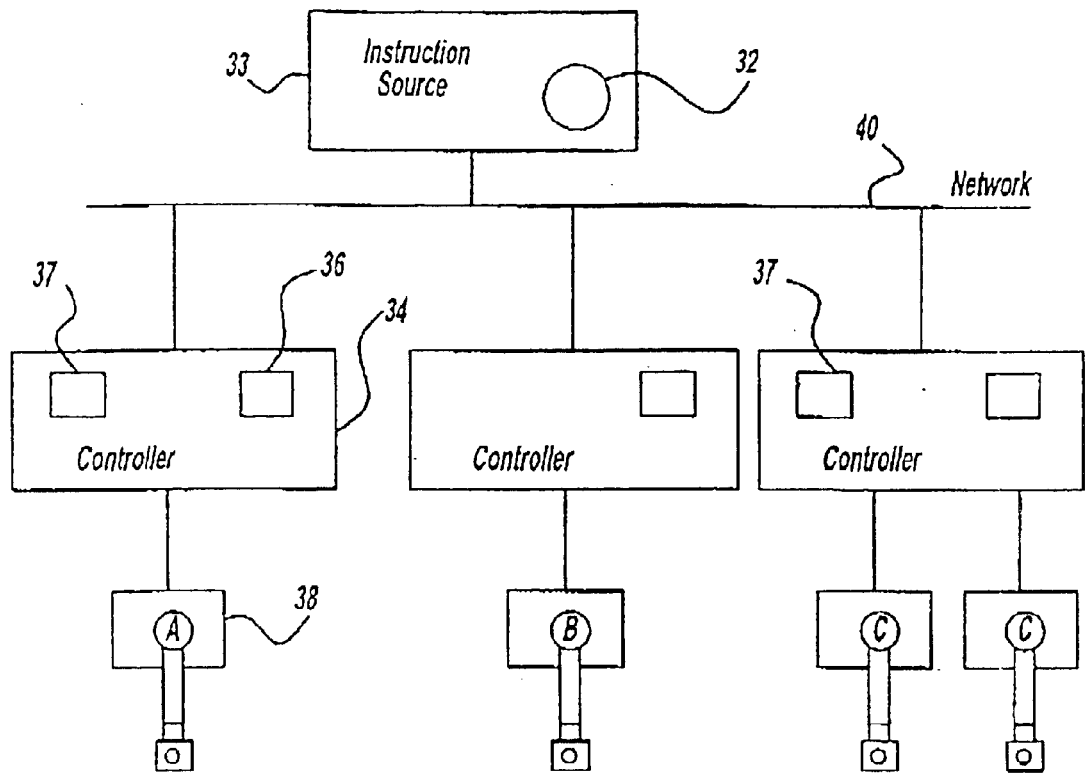
FIG. 3 is a block diagram depicting a robot control system in accordance with the present invention.

In accordance with the present invention, a robot control system 30 for coordinating the operation amongst various robotic machines is depicted in FIG. 3. The robot control system 30 comprises a control program instruction source 32 and a plurality of robot controllers 34 interconnected by a computer network 40. Although the instruction source 32 is depicted as residing on a separate computing device 33, it is envisioned that it may alternatively reside on one of the robot controllers 34 and that multiple instruction sources of these forms may exist simultaneously in a robot control system. In addition, one or more of the robot controllers may have a local instruction source 37. Each robot controller 34 further includes an associated motion system 36 adapted to control a physically attached robotic machine 38 and its associated mechanisms. It is to be understood that the robot controller and associated motion system need not be physically attached, but are in data communication with, the robotic machine. it is further understood that an associated motion system 36 may also be adapted to control more than one robotic machine.

Figure 4A:
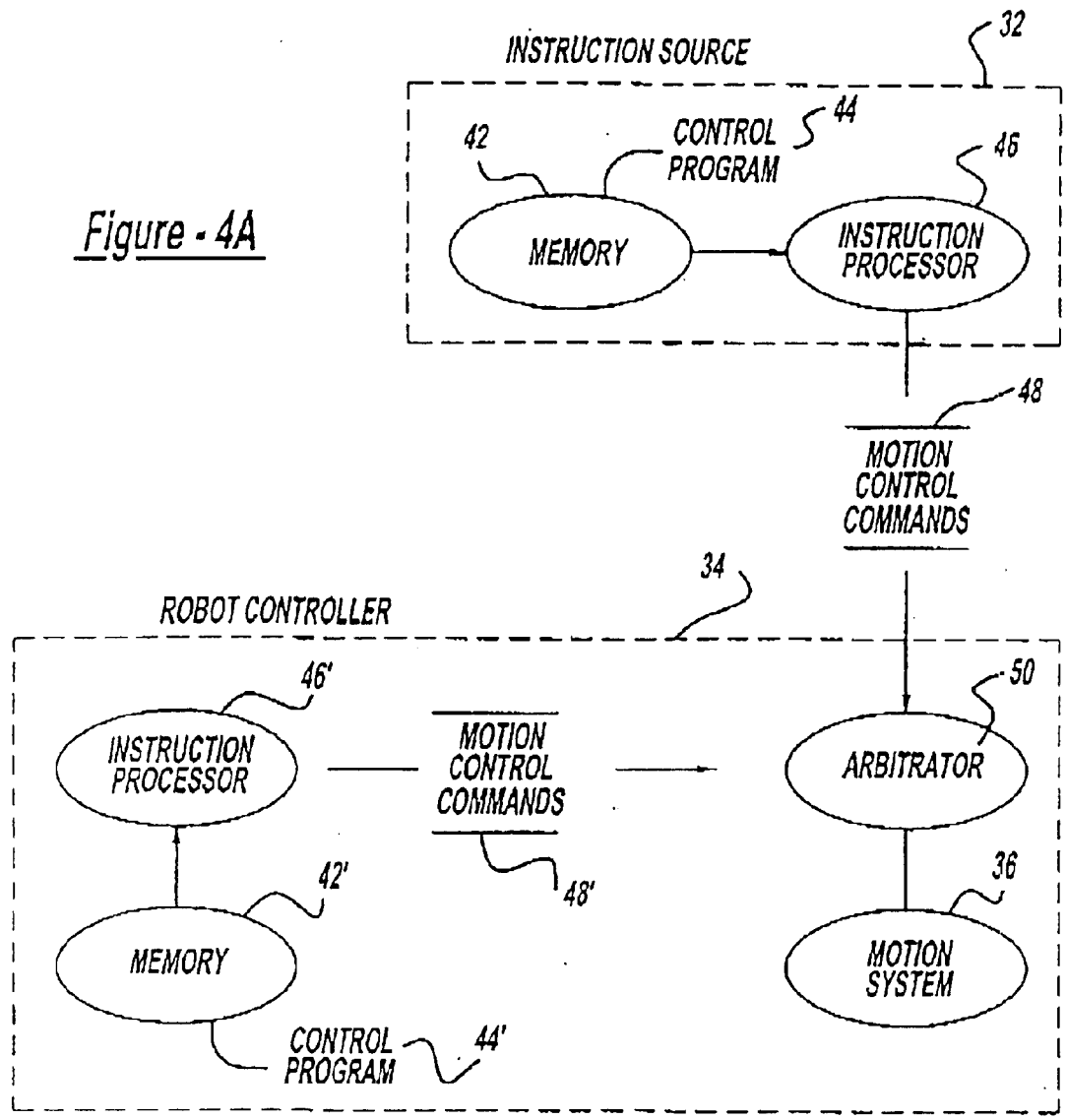
FIGS. 4A and 4B are diagrams illustrating exemplary mutual exclusion mechanisms in accordance with the present invention.

Referring to FIG. 4A, the instruction source 32 includes a memory 42 for storing at least one robot control program 44 and an instruction processor 46 for converting the robot control program 44 into a first set of motion control commands 48. Although an interpreter is preferably used as the instruction processor, this is not intended as a limitation on the broader aspects of the present invention. On the contrary, the instruction processor may be implemented in other forms, such as a computer executing instructions compiled into the native language of the computer. The instruction source 32 is further operable to supply motion control commands across the computer network 40 to one or more of the robot controllers 34.

Likewise, each of the robot controllers 34 may be configured with a memory 42' for storing at least one robot control program 44' and an instruction processor 46' for converting the robot control program 44' into a second set of motion control commands 48'. The robot controller 34 further Includes an arbitrator 50. In operation, the arbitrator 50 receives motion control commands and directs them to the motion system 36 associated with the robot controller 34. To the extent that the arbitrator 50 receives motion control commands from more than one control program and/or from more than one instruction source, it mediates the operating state of motion system 36, such that only the appropriate commands are acted upon by each of the robots under control of that motion system.

In an preferred embodiment, attach/detach commands embodied in the motion control commands are used to dictate the operating state of the motion system 36. The arbitrator 50 generally implements a detached state on behalf of the robots under its control. Upon receipt of an attach command from a control program for the specific robot, the arbitrator 50 gives the control program logical temporary ownership of the robot. This is referred to as an attached state. For instance, the arbitrator 50 may receive an attach command from a control program 44' via the instruction processor 46' residing on the local robot controller 34.

In this instance, the arbitrator 50 will only direct the motion control commands received from that control program 44' to the motion system 36 on behalf of a robot.

Likewise, the arbitrator 50 may receive an attach command from a control program 44 residing on a remote instruction source 32. In this instance, the arbitrator 50 will only direct the motion control commands received from that control program 44 to the motion system 36 on behalf of a robot. When in an attached state, the arbitrator 50 on behalf of a particular robot will not accept motion control commands for that robot from a control program other than the control program that initiated the attached state. Furthermore, a control program is able to detect that a robot is attached to another control program and then wait on the availability of that robot, via its attach command The arbitrator will return to a detached state on behalf of that robot upon receipt of a detach command from the control program that initiated the attached state. In this way, the robot control system 30 is able to coordinate the operation of various robotic machines 38 This is especially useful for closely coordinated synchronous operation of multiple machines, as they can be handled from one program after having been attached to that control program.

It is envisioned that the attach/detach commands may be separate from the motion control commands, and thus sent independently in message format to the arbitrator. In this approach, motion control commands are sent directly to the motion system and an additional message is sent from the arbitrator to the motion system instructing it as to the appropriate motion control commands which are to be acted upon by each of the robots under control of that motion system.

Figure 4B:
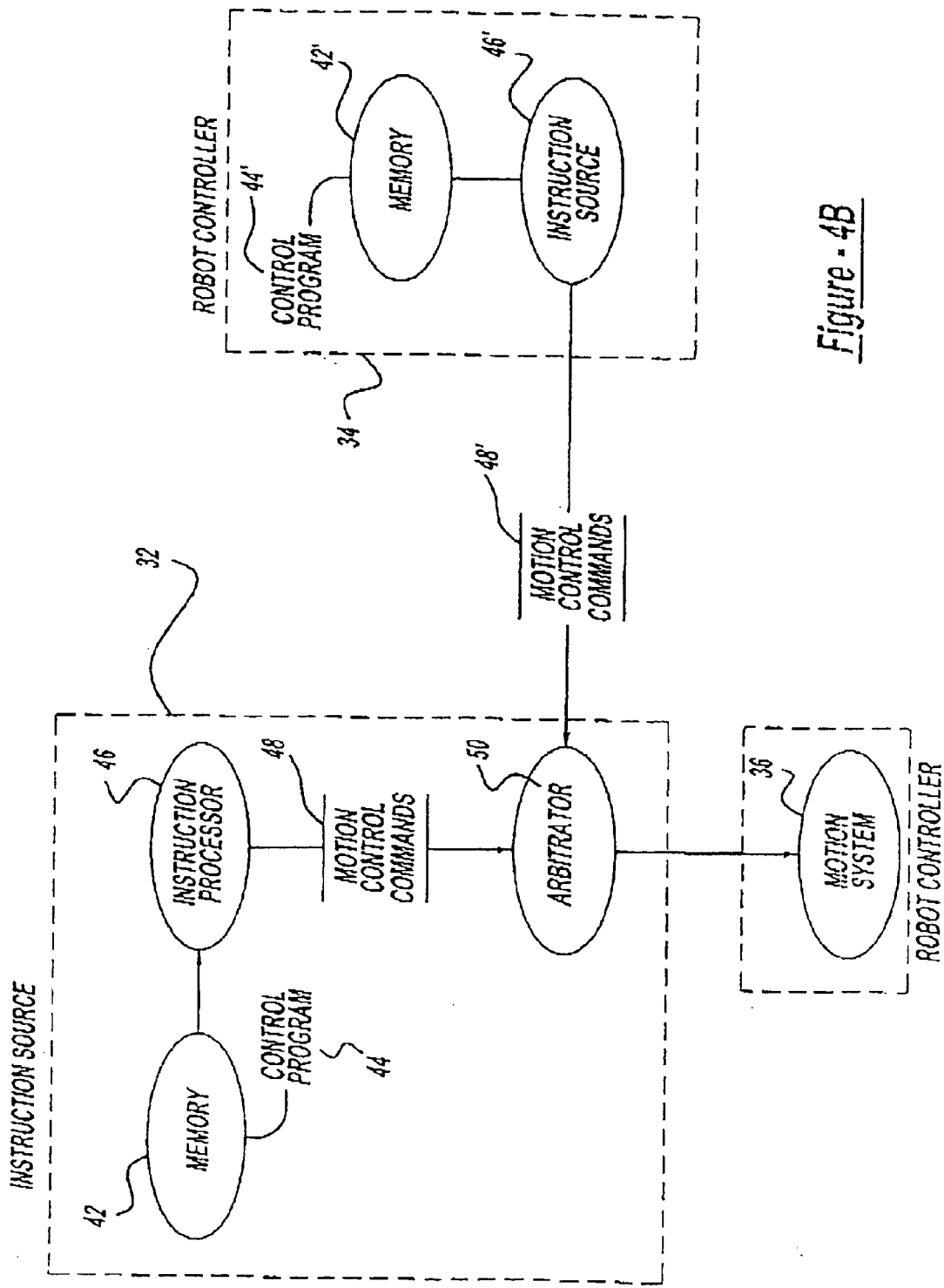

Alternatively, the arbitrator may reside on the remote instruction source as shown in FIG. 4B. In this embodiment, the arbitrator 50 may also receive motion control commands from two or more robot control programs. To the extent that the arbitrator 50 receives motion control commands from more Than one control program and/or from more than one instruction source, it mediates the operating state of a motion system 36, such that only the appropriate commands are acted upon by each of the robots under control of that motion system. In this embodiment, the attach/detach commands are preferably separated from the motion control commands and sent independently to the arbitrator as described above. The arbitrator 50 then sends a message to the motion system 36 instructing it as to the appropriate motion control commands which are to be acted upon by each of the robots under control of that motion system; otherwise, the mediation mechanism may be as described above in relation to FIG. 4A.

The above description has been provided with reference to attach/detach commands. It is envisioned that other mutual exclusion mechanisms may be employed to control the operating state of the motion system 36. For example, a simple configuration of the robot control system Could determine a predetermined owner of a given motion system at power on or initialization time. Subsequently, an operator could change the instruction source that has ownership of the given motion system via an operator interface. Alternatively, a PLC could change the instruction source that has temporary ownership via I/O interaction with the various robot controllers. It is further envisioned that the mediation mechanism may be some combination of these techniques. For example, at power-on, configuration would determine a default instruction source that has initial ownership of a given motion system, and the default instruction source would subsequently issue detach commands to make the given motion system available to a different instruction source issuing an attach command. Other mediation mechanisms that control the operating state of a given motion system are also within the scope of the present invention.

Figure 5:
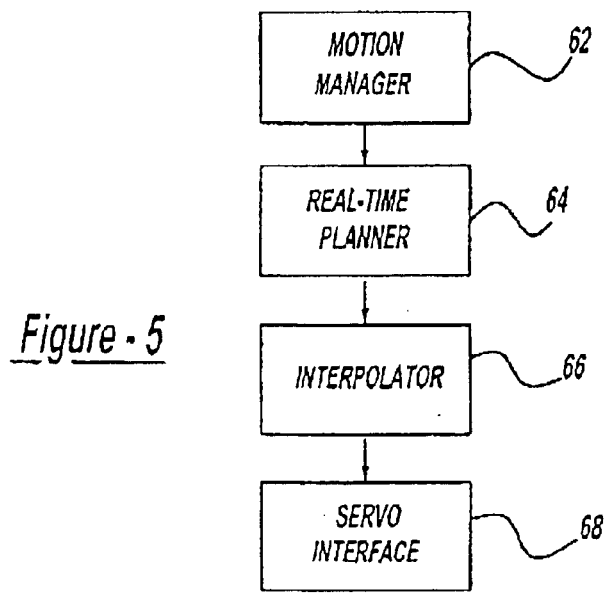
FIG. 5 is a block diagram depicting an exemplary motion system architecture for a robot controller.

FIG. 5 illustrates an exemplary motion system architecture 60 for the robot controller 34. The motion system architecture 60 includes a motion manager 62, a real-time planner 64, an interpolator 66, and a servo interface 68. While real-time planning and interpolation are well known in the art, the coordination of synchronized and independent motions by exchange of control between control programs is either not provided for in the art, or is handled partially by the instruction source interpreter so that assigning logical temporary ownership of the motion system to a control program processed by an instruction source of a different controller is not possible. In the exemplary motion system 60, the motion manager 62 is responsible for coordinating the independent and synchronized motions of the corresponding robotic machine, and is completely independent from the operation of any particular instruction source. In one embodiment, the motion manager 62 serves as the arbitrator. Thus, the motion manager 62 is adapted to receive motion control commands from control programs processed by two or more instruction sources in the robot control system, where the motion manager may reside on the same or different computing device as the instruction sources.

The foregoing discloses and describes merely exemplary embodiments of the present invention. One skilled in the art will readily recognize from such discussion, and from accompanying drawings and claims, that various changes, modifications, and variations can be made therein without departing from the spirit and scope of the present invention.

What is claimed is:

1. A robot control system comprising:
    a plurality of robot controllers, each robot controller having an associated motion system controlling at least one robotic machine, where the associated motion system receives motion control commands from more than one robot control program;
    a remote program instruction source that supplies motion control commands to said plurality of robot controllers, the instruction source having a memory for storing at least one robot control program and an instruction processor for converting said robot control program into motion control commands;
    a mutual exclusion mechanism residing on either the remote program instruction source or one of the plurality of robot controllers, wherein the mutual exclusion mechanism prevents simultaneous access by more than one robot control program to a given robotic machine; and
    a computer network over which said remote instruction source and said plurality of robot controllers communicate, whereby the remote instruction source propagates motion control commands over the computer network to selected ones of said plurality of robot controllers.

2. The robot control system of claim 1 wherein the remote instruction source is operable to issue a set of motion control commands to more than one motion system.

3. The robot control system of claim 2 wherein the set of motion control commands are derived from only one robot control program associated with the remote instruction source.

4. The robot control system of claim 3 wherein the remote instruction source is operable to issue a first set of motion control commands for a first robotic machine to a first motion system associated with a first robot controller and second set of motion control commands for a second robotic machine to a second motion system associated with a second robot controller, thereby causing sequential motion coordination amongst the first and second robotic machines.

5. The robot control system of claim 3 wherein the remote instruction source is operable to issue a first set of motion control commands to a first motion system associated with a first robot controller for a first robotic machine and to second motion system associated with a second robot controller for a second robotic machine, thereby causing temporal motion coordination amongst the first and second robotic machines.

6. The robot control system of claim 5 wherein at least one of the motion control commands embodies a first instruction for the first robotic machine and a second instruction for the second robotic machine, such that the first instruction is different from the second instruction.

7. The robot control system of claim 1, wherein an associated motion system for a given robot controller receives motion control commands and operable to control two or more robotic machines based on the motions control commands.

8. The robot control system of claim 1 wherein the remote instruction source is associated with one of the plurality of robot controllers.

9. The robot control system of claim 1 wherein the mutual exclusion mechanism is further defined as an arbitrator that mediates amongst motion control commands received from different robot control programs.

10. The robot control system of claim 9 wherein the arbitrator is embodied in the associated motion system of the selected ones of said plurality of robot controllers.

11. A robotic control system comprising:
   a plurality of robot controllers, each robot controller having an associated motion system controlling at least one robotic machine;
   a remote instruction source that supplied motion control commands to said plurality of robot controllers, the remote instruction source having a memory for converting said robot control program into motion control commands;
   a computer network over which said remote instruction source and said plurality of robot controllers communicate; and
   a command initiated by said instruction source and propagated over said computer network to selected ones of said plurality of robot controllers, where the command gives the remote instruction source logical temporary ownership of the motion systems for the selected ones of said plurality of robot controllers.

12. The robot control system of claim 11 wherein the command is further defined as an attach/detach command embodied in the motion control commands received by the associated motion system of the selected ones of said plurality of robot controllers.

13. The robot control system of claim 11 wherein the remote instruction source is operable to issue a set of motion control commands to more than one motion system.

14. The robot control system of claim 13 wherein the set of motion control commands is derived from only one robot control program associated with the remote instruction source.

15. The robot control system of claim 13 wherein the remote instruction source is operable to issue a first set of motion control commands for a first robotic machine to a first motion system associated with a first robot controller and a second set of motion control commands for a second robotic machine to a second motion system associated with a second robot controller, thereby causing sequential motion coordination amongst the first and second robotic machines.

16. The robot control system of claim 13 wherein the remote instruction source is operable to issue a first set of motion control commands for a first robotic machine to a first motion system associated with a first robot controller and a second set of motion control commands for a second robotic machine to a second motion system associated with a second robot controller, thereby causing temporal motion coordination amongst the first and second robotic machines.

17. The robot control system of claim 11 wherein the remote instruction source is associated with one of the plurality of robot controllers.

18. The robot control system of claim 11 wherein the selected ones of said plurality of robot controllers further includes an arbitrator that mediates amongst motion control commands received from different robot control programs.

19. The robot control system of claim 18 wherein the arbitrator is embodied in the associated motion system of the selected ones of said plurality of robot controllers.

* * * * *